United States Patent
Yamada et al.

(10) Patent No.: US 11,700,790 B2
(45) Date of Patent: Jul. 18, 2023

(54) GRASS MOWING MACHINE

(71) Applicant: Kubota Corporation, Osaka (JP)

(72) Inventors: Masahiro Yamada, Sakai (JP); Fumiya Yasue, Sakai (JP)

(73) Assignee: Kubota Corporation, Osaka (JP)

( * ) Notice: Subject to any disclaimer, the term of this patent is extended or adjusted under 35 U.S.C. 154(b) by 430 days.

(21) Appl. No.: 15/930,534

(22) Filed: May 13, 2020

(65) Prior Publication Data

US 2020/0359565 A1    Nov. 19, 2020

(30) Foreign Application Priority Data

May 17, 2019   (JP) ................. 2019-093691

(51) Int. Cl.
| | |
|---|---|
| *A01D 34/00* | (2006.01) |
| *A01D 67/00* | (2006.01) |
| *A01D 34/64* | (2006.01) |
| *A01D 34/73* | (2006.01) |
| *A01D 34/78* | (2006.01) |
| *A01D 34/81* | (2006.01) |
| *A01D 69/02* | (2006.01) |
| *A01D 101/00* | (2006.01) |

(52) U.S. Cl.
CPC .......... *A01D 67/005* (2013.01); *A01D 34/64* (2013.01); *A01D 34/733* (2013.01); *A01D 34/78* (2013.01); *A01D 34/81* (2013.01); *A01D 69/02* (2013.01); *A01D 2101/00* (2013.01)

(58) Field of Classification Search
CPC .... A01D 67/005; A01D 34/64; A01D 34/733; A01D 34/78; A01D 34/81; A01D 69/02
See application file for complete search history.

(56) References Cited

U.S. PATENT DOCUMENTS

| | | | | |
|---|---|---|---|---|
| 3,706,186 | A * | 12/1972 | Hurlburt ................ | A01D 34/74 56/15.8 |
| 4,893,456 | A * | 1/1990 | Wallace ................. | A01D 34/64 56/6 |
| 5,085,044 | A * | 2/1992 | Freier, Jr. ............. | A01D 34/685 56/16.9 |
| 5,483,789 | A * | 1/1996 | Gummerson ........ | A01D 34/661 56/14.7 |
| 5,502,957 | A * | 4/1996 | Robertson .......... | A01D 34/6806 56/10.2 G |

(Continued)

FOREIGN PATENT DOCUMENTS

| | | |
|---|---|---|
| CN | 109526402 A | 3/2019 |
| DE | 4407812 A1 | 9/1995 |

(Continued)

*Primary Examiner* — Hau V Phan
(74) *Attorney, Agent, or Firm* — The Webb Law Firm

(57) ABSTRACT

A grass mowing machine includes a vehicle body frame, a mower deck incorporating a rotary cutter blade, a coupling mechanism for coupling the mower deck to the vehicle body frame with allowing a lateral displacement of the mower deck in a vehicle body transverse direction, a mower electric motor attached to the mower deck and configured to feed rotary power to the rotary cutter blade and a displacement operation mechanism MV for laterally displacing the mower deck in the vehicle body transverse direction in operative association with the coupling mechanism.

10 Claims, 6 Drawing Sheets

(56) References Cited

U.S. PATENT DOCUMENTS

| | | | | |
|---|---|---|---|---|
| 6,223,510 B1* | 5/2001 | Gillins | ............... | A01D 34/84 56/15.1 |
| 6,584,756 B2* | 7/2003 | Buss | ............... | A01D 34/64 56/15.8 |
| 7,059,107 B2* | 6/2006 | Pulvirenti | ............... | A01G 3/062 172/16 |
| 7,587,886 B1* | 9/2009 | Sugden | ............... | A01D 34/661 56/14.9 |
| 7,669,394 B2* | 3/2010 | Finkner | ............... | A01D 34/74 56/14.9 |
| 9,307,696 B2* | 4/2016 | Elder | ............... | A01D 69/06 |
| 9,309,967 B2* | 4/2016 | Iida | ............... | B60K 20/04 |
| 9,622,406 B2* | 4/2017 | Tada | ............... | A01D 67/005 |
| 9,949,436 B2* | 4/2018 | Ito | ............... | A01D 34/73 |
| 2007/0028577 A1* | 2/2007 | Clement | ............... | A01D 34/64 56/17.2 |
| 2011/0289896 A1* | 12/2011 | Sasahara | ............... | A01D 34/78 56/11.9 |
| 2016/0014956 A1* | 1/2016 | Matsumoto | ............... | A01D 34/64 56/10.2 A |
| 2017/0013780 A1 | 1/2017 | Ito et al. | | |

FOREIGN PATENT DOCUMENTS

| | | |
|---|---|---|
| EP | 3689128 A1 | 8/2020 |
| FR | 2900023 A1 | 10/2007 |
| JP | 568221 U | 9/1993 |
| JP | 2012170336 A | 9/2012 |
| JP | 201718054 A | 1/2017 |
| JP | 201735029 A | 2/2017 |
| WO | 2010140929 A1 | 12/2010 |

* cited by examiner

GRASS MOWING MACHINE

CROSS-REFERENCE TO RELATED APPLICATION

This application claims priority to Japanese Patent Application No. 2019-093691 filed May 17, 2019, the disclosure of which is hereby incorporated by reference in its entirety.

TECHNICAL FIELD

The present invention relates to a grass mowing machine having a mower deck coupled to a vehicle body frame via a coupling mechanism.

BACKGROUND

For efficient implementation of a grass mowing operation using one or more rotary cutter blades provided on the mower deck, it is necessary to reduce an "offset amount" which is an overlap of mowing paths. Moreover, in the case of a grass mowing operation effected on a borderline between a tree or a house and a grassland, ability to locate the operational path of the rotary cutter blade as close as possible to the borderline is required also. To solve this problem, it is desired to employ an arrangement which allows displacement of the mowing path of the rotary cutter blade in the vehicle body transverse direction. Namely, employment of an arrangement that allows displacement of the mower deck in the vehicle body transverse direction is desirable.

For instance, in a grass mowing machine disclosed in Patent Document 1, at a rear PTO coupling portion of a tractor mounting an implement, there is mounted a parallel link mechanism which effects horizontal displacement in the vehicle body transverse direction. Moreover, a grass mowing implement is operably coupled to the leading end of this parallel link mechanism. The parallel link mechanism effects the horizontal displacement in association with an expanding/contracting motion of an electrically powered cylinder. Power to the grass mowing implement is transmitted by a power transmission mechanism consisting of a universal joint and a transmission shaft. Such parallel link mechanism and such power transmission mechanism have large and complicated arrangements. Due to such reasons as their weights and spaces required thereby, it is difficult to apply such parallel link mechanism and power transmission mechanism to a compact grass mowing machine such as a one-man riding grass mowing machine.

PRIOR-ART DOCUMENT

Patent Document

Patent Document 1: JP2017-35029A

DISCLOSURE OF THE INVENTION

Problem to be Solved by Invention

The principal object of the present invention is to provide a grass mowing machine that allows displacement of a mower deck in a vehicle body transverse direction through a simple arrangement that can be mounted even in a compact grass mowing machine.

Means to Solve Problem

A grass mowing machine according to the present invention comprises:

a vehicle body frame supported on a ground surface via a wheel unit;

a mower deck incorporating a rotary cutter blade;

a coupling mechanism for coupling the mower deck to the vehicle body frame with allowing a lateral displacement of the mower deck in a vehicle body transverse direction;

a mower electric motor attached to the mower deck and configured to feed rotary power to the rotary cutter blade; and a displacement operation mechanism for laterally displacing the mower deck in the vehicle body transverse direction in operative association with the coupling mechanism.

With this grass mowing machine, the rotary cutter blade of the mower deck is rotated by the mower electric motor mounted on this mower deck per se. As electric power is fed via a power cable from an electric power source disposed on the side of the vehicle body, the mower deck is driven. Thus, there is no need for such large and complicated power transmission mechanism comprised of combination of a universal joint and a transmission shaft. And, in this arrangement, if the coupling mechanism coupling the mower deck to the vehicle body frame has flexibility that allows displacement of the mower deck in the vehicle body transverse direction, displacement of the mower deck in the vehicle body transverse direction is made possible. The displacement operation mechanism causes the lateral displacement of the mower deck in the vehicle body transverse direction with utilization of such flexibility provided in the coupling mechanism. Thus, as the lateral displacement of the mower deck in the vehicle body transverse direction is realized by the displacement operation mechanism through effective utilization of the flexibility of the coupling mechanism in the vehicle body transverse direction, the arrangement provided for the lateral displacement of the mower deck can be simple. As a result, this mower deck lateral displacement arrangement can be applied to a compact grass mowing machine. Moreover, this arrangement can be easily and smoothly applied to such a grass mowing machine as a mid-mount mower which imposes significant space constraints due to disposing of its mower deck between front wheels and rear wheels.

In a grass mowing machine, adjustment of its height or ground clearance of the rotary cutter blade for adjusting the mowing height, namely, adjustment of the height or ground clearance of the mower deck is required. For simplification of an arrangement of a height adjustment mechanism that causes a heavy mower deck to be moved in the vertical direction, an arrangement utilizing the gravity, namely, an arrangement of suspending the mower deck from the vehicle body frame will be advantageous. For this reason, according to one preferred embodiment of the present invention, the coupling mechanism comprises a suspension mechanism for suspending the mower deck from the vehicle body frame.

According to a preferred embodiment of the present invention:

the suspension mechanism includes a vehicle body bracket fixed to the vehicle body frame and a mower bracket fixed to the mower deck and a mower link coupled by a pin coupling to the vehicle body bracket and the mower bracket; and the pin coupling is configured to allow a lateral displacement of the mower bracket in the vehicle body transverse direction relative to the vehicle body frame.

With the above-described arrangement, the vehicle body transverse direction flexibility required for allowing the lateral displacement of the mower deck by the displacement operation mechanism is provided by the pin-coupling portion. Namely, at this pin coupling portion, the lateral displacement of the mower deck is realized simply by creation of a free space there that allows the mower bracket to be laterally displaced in the vehicle body transverse direction along a link pin.

According to a further preferred embodiment of the present invention, the displacement operation mechanism includes an operational unit supported to the vehicle body frame and a displacement conversion mechanism for converting an operational displacement of the operational unit to a lateral displacement of the mower deck.

With the above-described arrangement, the operational unit can be disposed on vehicle body frame side, not on the mower deck side. Thus, the operational unit can be disposed at a location easily operable or accessible by a driver of the grass mowing machine.

In case hydraulic power or electric power is not to be used for the lateral displacement of the mower deck for the sake of desirable simplicity of the displacement operation mechanism, the required operational force by the driver for the lateral displacement is large. And, in order to generate such large operational force, it will be desirable to utilize the force from the foot of the driver. For this reason, according to one preferred embodiment of the present invention, the operational unit comprises a pedal unit operated by a driver's foot and the operational displacement comprises a step-on displacement of a pedal.

The presumably simplest arrangement for providing the lateral displacement of the mower deck is a two-position switching method. If this method is to be realized by a foot operation, two foot pedals may be provided, with left displacement or right displacement being assigned to each pedal. This arrangement can realize an easy-to-use and failure-safe operation. Thus, according to one preferred embodiment of the present invention:

the pedal unit includes a first pedal and a second pedal; and the displacement conversion mechanism is configured to convert a step-on displacement of the first pedal into a lateral displacement in one direction of the mower deck and to convert a step-on displacement of the second pedal into a lateral displacement in the other direction of the mower deck.

With the inventive grass mowing machine in which the rotary cutter blade is driven by a mower electric motor, if driving of traveling wheels is also effected by the electric motor, this allows co-use of a battery and power electronic components advantageously. For this reason, according to one preferred embodiment of the present invention, the grass mowing machine is configured such that its traveling drive power is fed by a traveling electric motor.

MODES OF CARRYING OUT THE INVENTION

Figure 1:
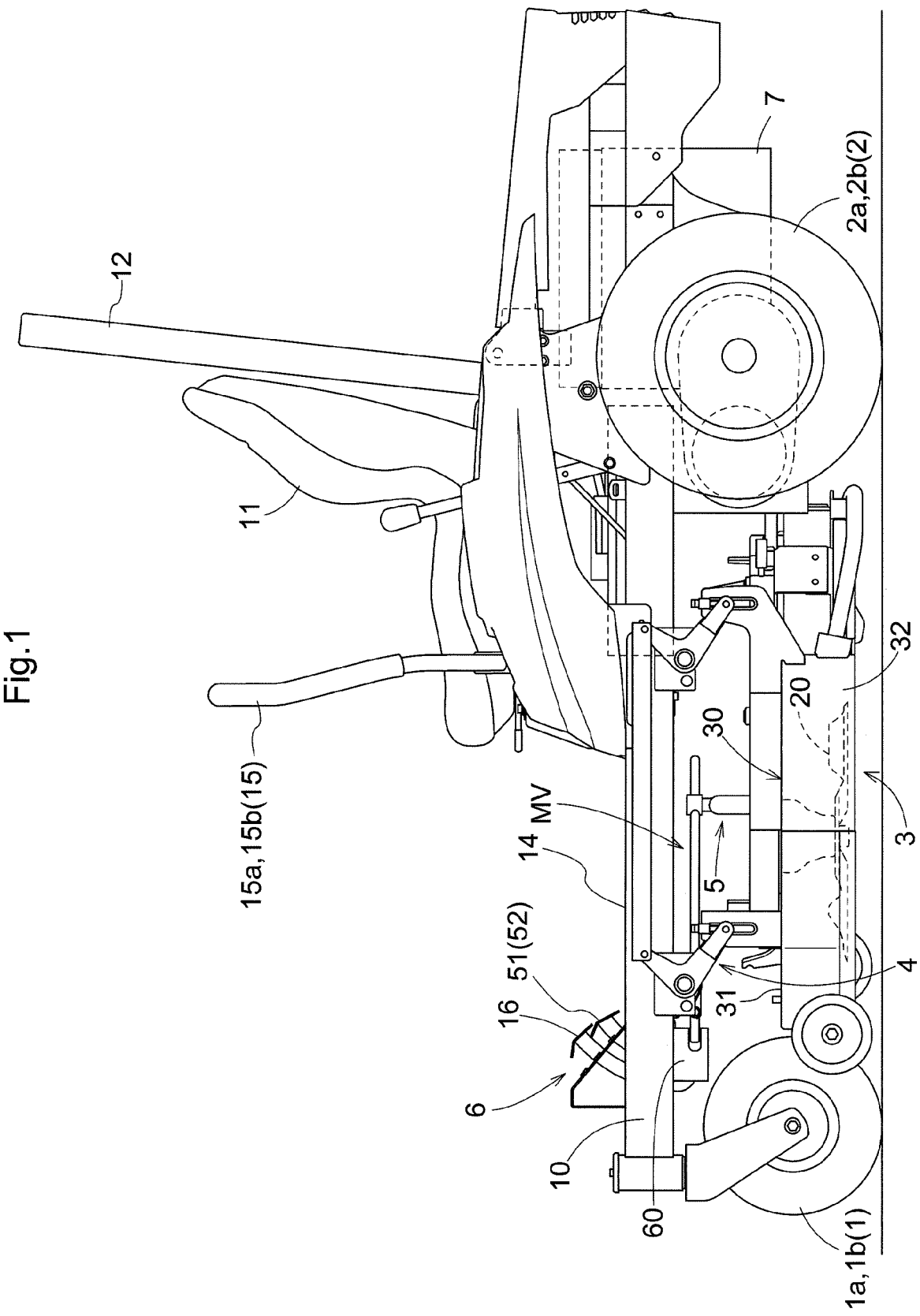
FIG. 1 is a left side view of a riding grass mowing machine.

With reference to the accompanying drawings, there will be explained a mid-mount type riding grass mowing machine mounting a mower unit according to one embodiment of the present invention. FIG. 1 shows a left side view of the grass mowing machine. Here, unless explicitly indicated otherwise, the term "front" means the front side in relation to a machine (vehicle) body front/rear direction (traveling direction), the term "rear" means the rear side in relation to the machine body front/rear direction (traveling direction). Further, the left/right direction or the lateral direction refers to the machine body width direction which is orthogonal to the machine body front/rear direction. The terms "upper" and "lower" refer to positional relations in the perpendicular (vertical) direction of the machine body, representing the relation in connection with the ground height or clearance.

This grass mowing machine includes a vehicle body frame 10 supported via a front wheel unit 1 and a drive wheel unit 2, a battery 7, a driver's seat 11, and a ROPS frame 12. The front wheel unit 1 includes a left front wheel 1a and a right front wheel 1b. The left front wheel 1a and the right front wheel 1b are freely rotatable caster type wheels. The drive wheel unit 2 includes a left rear wheel 2a and a right rear wheel 2b. The battery 7 is disposed at a rear portion of the vehicle body frame 10. The driver's seat 11 is disposed on more front side than the battery 7. The ROPS frame 12 is mounted erect upward at a position in the vehicle body frame 10 and between the driver's seat 11 and the battery 7. Under the vehicle body frame 10, a mower deck 30 is provided in a space between the front wheel unit 1 and the drive wheel unit 2. This mower deck 30 constitutes a mower unit 3.

Forwardly of the driver's seat 11, a floor plate 14 is formed. The floor plate 14 acts as a "footrest" for the driver. On the left and right opposed sides across the driver's seat 11, there are disposed a pair of left and right steering units 15. The left and right steering units 15 consist of a left steering lever 15a and a right steering lever 15b. The left steering lever 15a and the right steering lever 15b respectively is pivotable about a horizontal axis extending in the vehicle body lateral or transverse direction.

Figure 2:
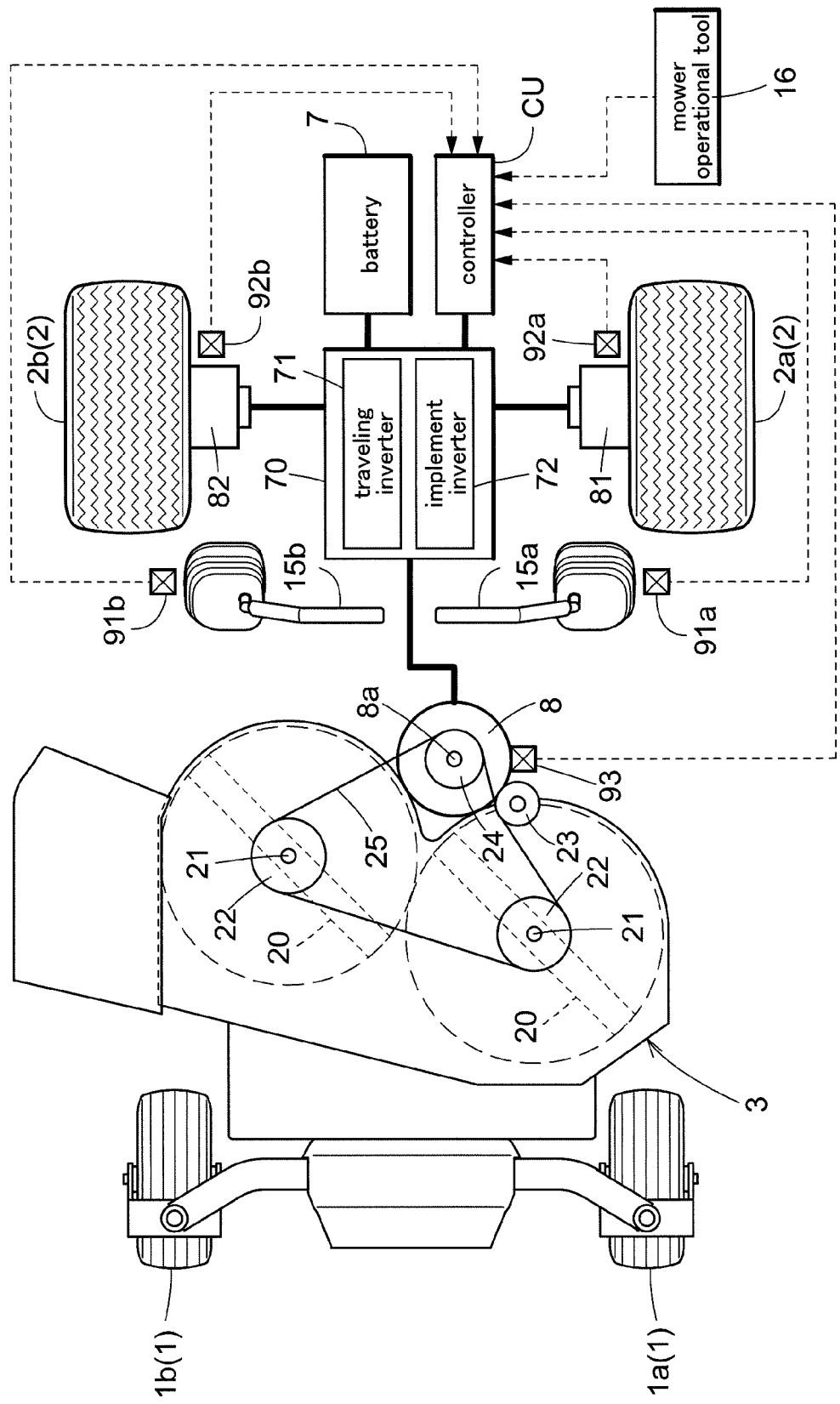
FIG. 2 is a power system diagram of the riding grass mowing machine.

As shown in FIG. 1 and FIG. 2, the mower unit 3 is configured as a "side-discharge" type unit, and the mower unit 3 includes the mower deck 30 and two rotary cutter blades 20. A pair of rotary shafts 21 corresponding respectively to the two rotary cutter blades 20 extend downwards through a top wall 31 of the mower deck 30. The pair of rotary shafts 21 are rotatably supported to the top wall 31 via bearings. At the respective lower ends of the respective rotary shafts 21, the rotary cutter blades 20 are fixed.

Each rotary cutter blade 20 is rotated by a mower electric motor 8. This mower electric motor 8 has a flattened shape.

An output pulley 24 is attached to the leading end of an output shaft 8a of the mower electric motor 8. Further, in each rotary shaft 21, at a portion thereof located upwardly of the top wall 31, an input pulley 22 is attached. And, a belt 25 is wound around and across the two input pulleys 22, a single tension pulley 23 and the one output pulley 24.

As shown in FIG. 2, the left rear wheel 2a is rotatably driven by a left motor 81 and the right rear wheel 2b is rotatably driven by a right motor 82. The left motor 81 and the right motor 82 function as "traveling electric motors". And, an inverter section 70 is configured to be able to feed electric power to the left motor 81 and the right motor 82 and the mower electric motor 8. The inverter section 70 includes a traveling inverter 71 and an implement inverter 72. The traveling inverter 71 feeds power to the left motor 81 and the right motor 82. The implement inverter 72 feeds power to the mower electric motor 8. The inverter section 70 drives based on control signals from a controller CU.

To the controller CU, there are connected a mower operational tool 16, a left steering angle detection sensor 91a, a right steering angle detection sensor 91b, a left rotation detection sensor 92a, a right rotation detection sensor 92b, and a mower rotational speed sensor 93. The mower operational tool 16 is used for effecting ON/OFF operations and rotational speed adjustment operation of the mower electric motor 8. The left steering angle detection sensor 91a detects a pivotal angle of the left steering lever 15a. The right steering angle detection sensor 91b detects a pivotal angle of the right steering lever 15b. The left rotation detection sensor 92a detects a rotational speed of the left motor 81. The right rotation detection sensor 92b detects a rotational speed of the right motor 82. The mower rotational speed sensor 93 detects a rotational speed of the mower electric motor 8.

Based on a pivotal angle of the left steering lever 15a detected by the left steering angle detection sensor 91a, the controller CU calculates the rotational speed of the left rear wheel 2a, namely, calculates a rotational speed of the left motor 81. Based on a pivotal angle of the right steering lever 15b detected by the right steering angle detection sensor 91b, the controller CU calculates the rotational speed of the right rear wheel 2b, namely, calculates a rotational speed of the right motor 82. Then, the controller CU outputs control signals for rotational speeds respectively of the left motor 81 and the right motor 82 to the traveling inverter 71. The traveling inverter 71 is configured to be capable of outputting electric powers independently to the left motor 81 and the right motor 82. And, by feeding different power values to the left motor 81 and the right motor 82, the traveling inverter 71 can make the respective rotational speeds of the left rear wheel 2a and the right rear wheel 2b different from each other. And, based on a speed difference between the left rear wheel 2a and the right rear wheel 2b, a turning of the grass mowing machine is effected.

Figure 3:
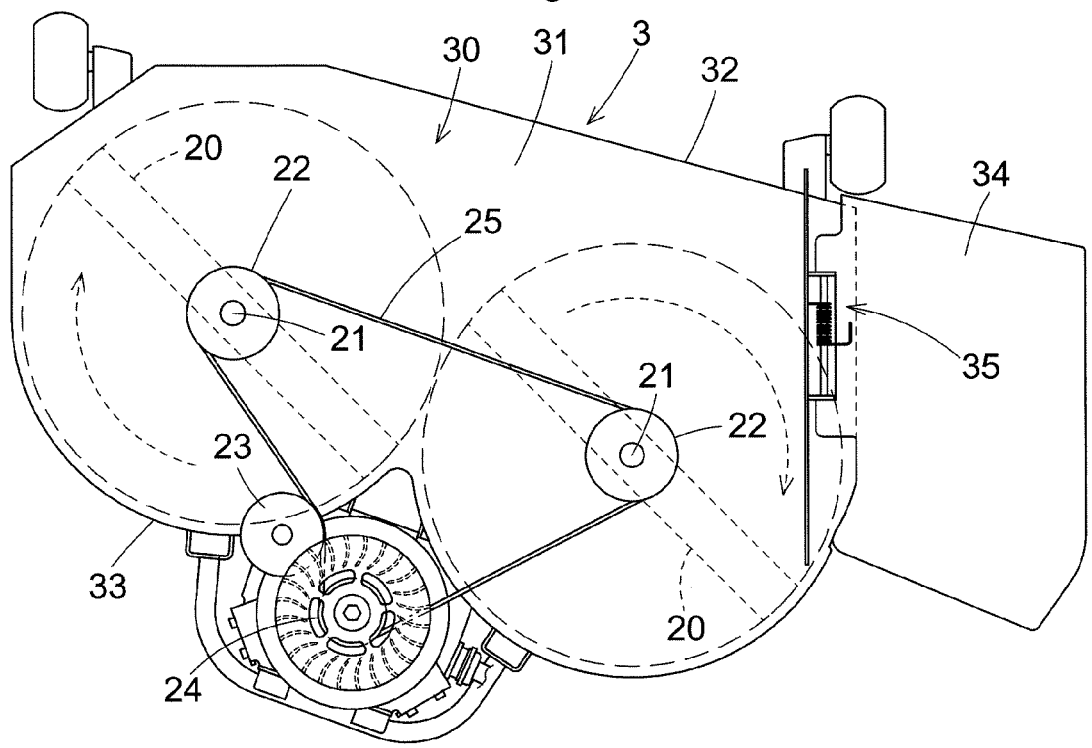
FIG. 3 is a plan view of a mower unit.
Figure 4:
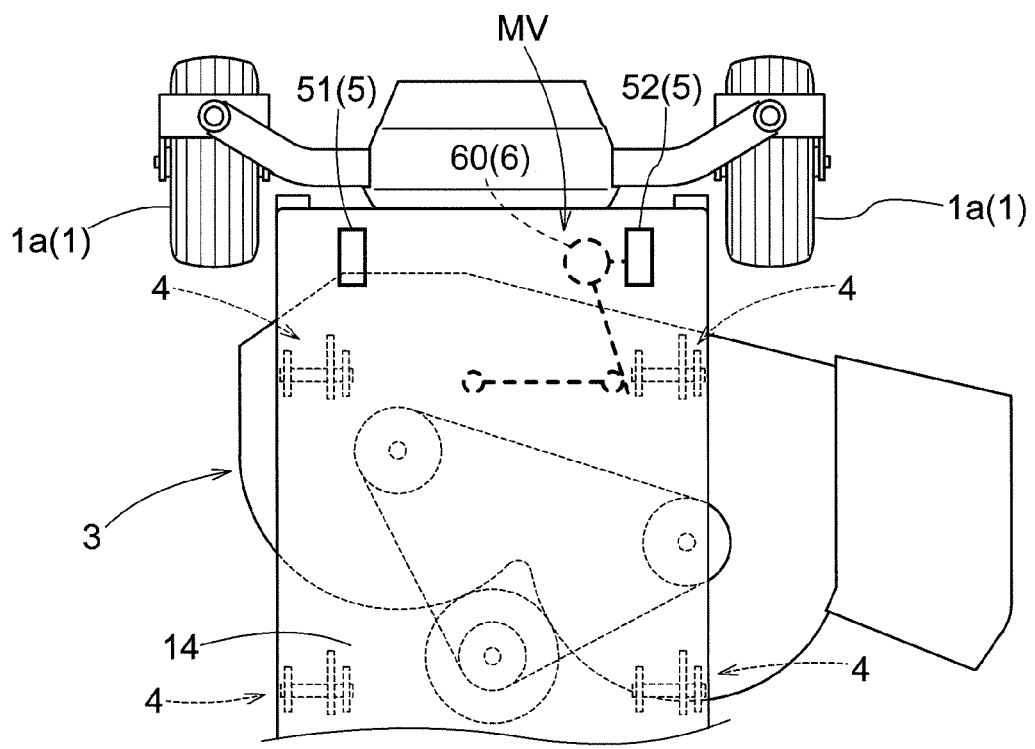
FIG. 4 is a plan view schematically showing relation between a coupling mechanism and an operation of a second pedal for displacing the mower unit to the right side.
Figure 5:
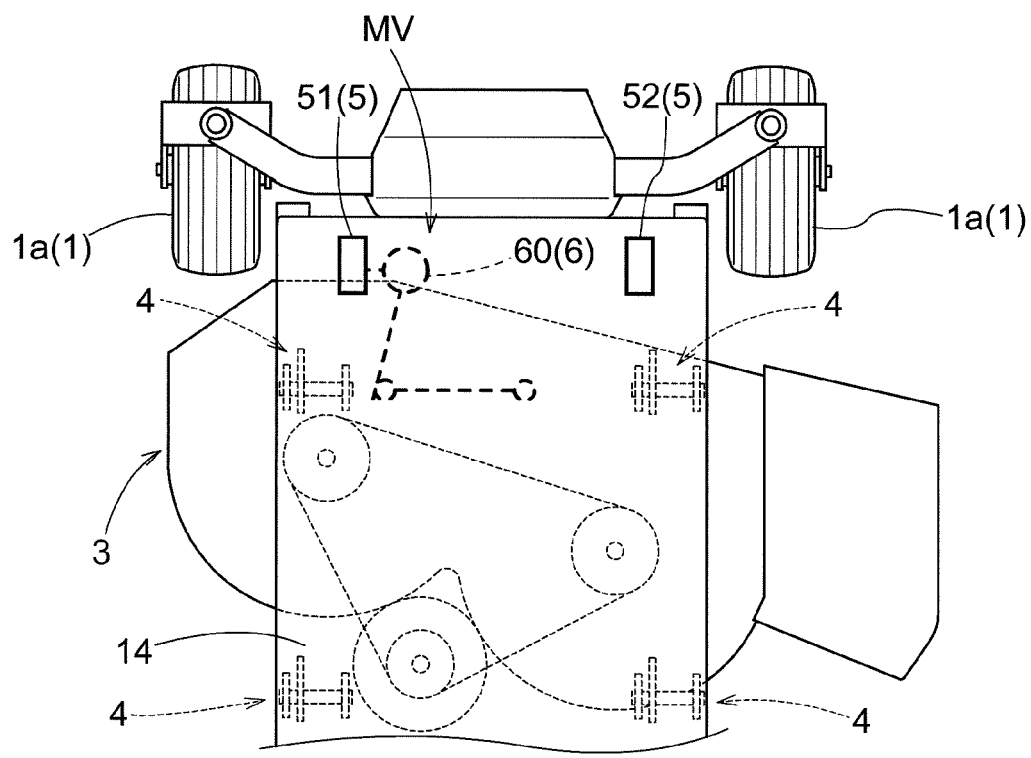
FIG. 5 is a plan view schematically showing relation between a coupling mechanism and an operation of a first pedal for displacing the mower unit to the left side.

As shown in FIG. 3, the mower deck 30 includes the top wall 31 and a front wall 32 and a rear wall 33 which extend downward from the outer circumferential edge of the top wall 31. The front wall 32 is continuous with the front side outer circumferential edge of the top wall 31 and the rear wall 33 is continuous with the rear side outer circumferential edge. Right end areas of the front wall 32 and the rear wall 33 are cutaway, thus creating a cut grass discharge outlet 35 covered by a cover 34. The top wall 31, the front wall 32 and the rear wall 33 together form a space inside the mower deck 30. In this inner space, the two rotary cutter blades 20 are disposed in juxtaposition along the vehicle body transverse direction.

As shown in FIG. 1, the mower deck 30 is suspended from the vehicle body frame 10 to be liftable up/down via a suspension mechanism 4 which functions as a "coupling mechanism" for operably coupling the mower deck 30 to the vehicle body frame 10. Further, the mower deck 30 is laterally displaceable in the vehicle body transverse direction by a displacement operation mechanism MV.

Figure 6:
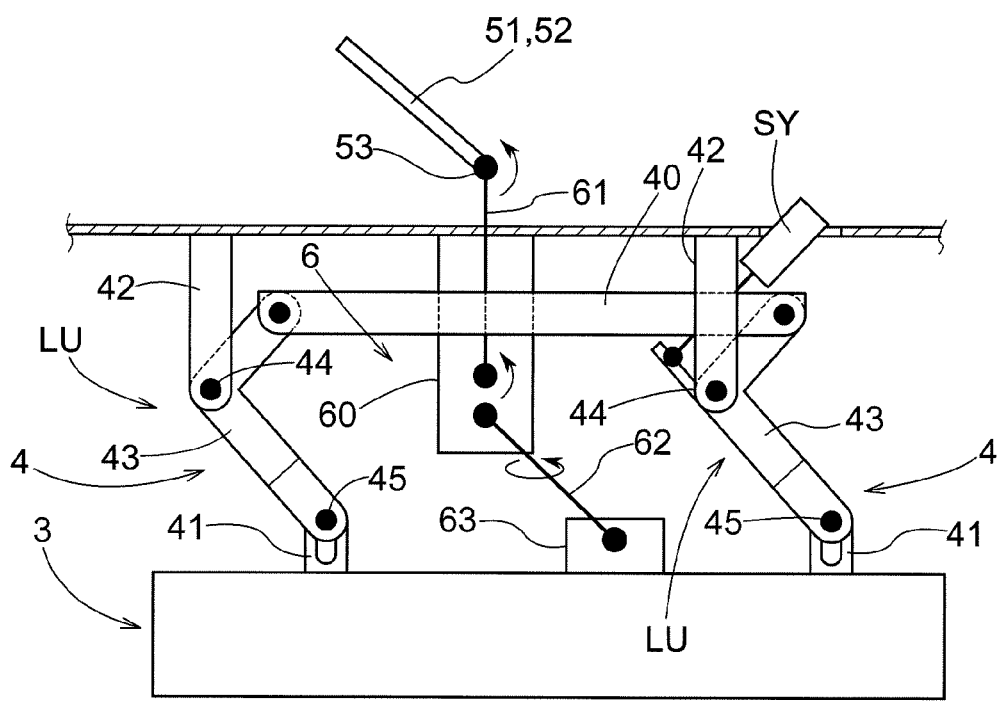
FIG. 6 is an explanatory view schematically showing a displacement operation mechanism consisting of an operational unit and a displacement conversion mechanism.

Schematic arrangements of the suspension mechanism 4 and the displacement operation mechanism MV are shown in FIGS. 4 through 8. The suspension mechanism 4, as shown in FIG. 1, is a parallel crank mechanism employed in conventional grass mowing machines. However, unlike the convention, this suspension mechanism 4 is capable of not only lifting up/down the mower deck 30, but also displacing this mower deck 30 in the vehicle body transverse direction. The suspension mechanism 4, as shown in FIG. 6, includes four link units. Each link unit includes a mower bracket 41 fixed to the mower deck 30, a vehicle body bracket 42 fixed to the vehicle body frame 10, and a mower link 43 operably coupling the mower bracket 41 with the vehicle body bracket 42. The vehicle body bracket 42 and the mower link 43 are connected via an upper link pin 44. The mower bracket 41 and the mower link 43 are connected via a lower link pin 45. The left front mower link 43 and the left rear mower link 43 are connected via a connection rod 40. The right front mower link 43 and the right rear mower link 43 are connected via a connection rod 40.

In the example shown in FIG. 6, as the rear mower links 43 are operated by a hydraulic or electric lift cylinder SY, the mower deck 30 is lifted up/down. The point of action of the lift cylinder SY on the link unit may be other than the rear mower links 43. Needless to say, lifting up/down of the mower deck 30 may be carried out manually also without using the lift cylinder SY.

Figure 7:
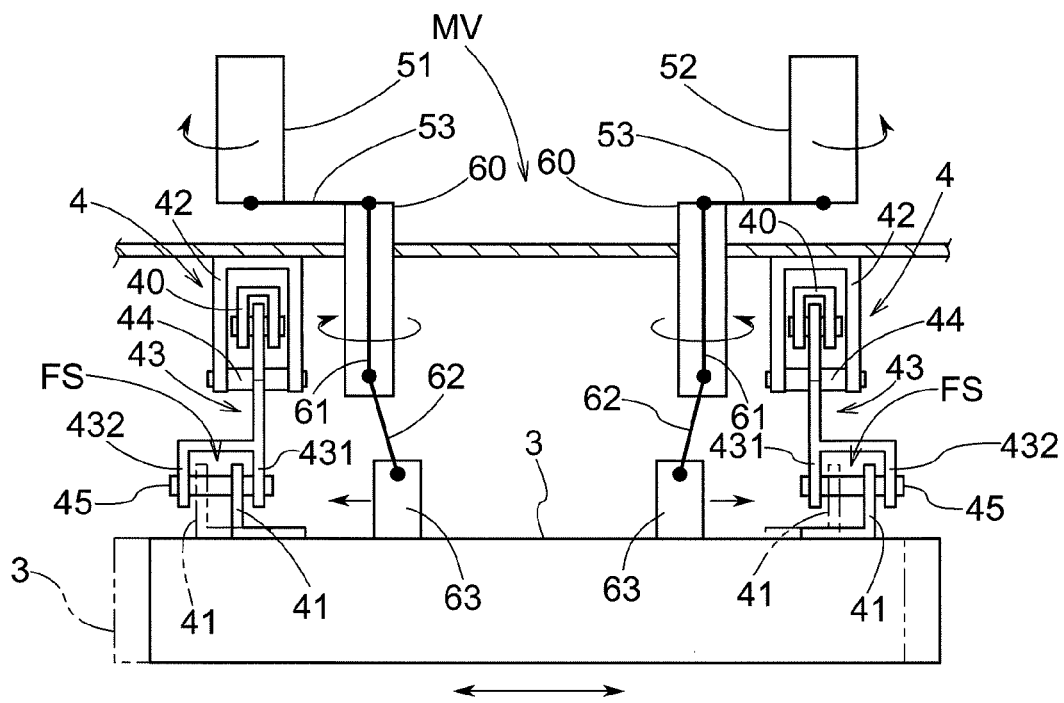
FIG. 7 is an explanatory view schematically showing movements of the displacement operation mechanism consisting of the operational unit and the displacement conversion mechanism and a coupling mechanism.

The mower links 43 of the suspension mechanism 4, in order to enable the displacement of the mower deck 30 in the vehicle body transverse direction, consists of a main link 431 and an angle-shaped auxiliary link 432, as shown in FIG. 7. The auxiliary link 432 is fixed to the main link 431 in such a manner as to secure a free space FS in the vehicle body transverse direction between the main link 431 and the auxiliary link 432. The main link 431, the auxiliary link 432 and the mower bracket 41 are pin-connected to each other. Here, the main link 431, the auxiliary link 432 and the mower bracket 41 are coupled to be pivotable relative to each other by a lower link pin 45 which extends through holes formed respectively therein, with a positional relationship of a vertical piece of the mower bracket 41 entering the free space FS of the mower link 43. Therefore, the length of the lower link pin 45 is greater than the length of the free space FS in the vehicle body transverse direction. With this arrangement, the mower deck 30 is able to be laterally displaced in the vehicle body transverse direction substantially by the distance between the main link 431 and the auxiliary link 432.

Figure 8:
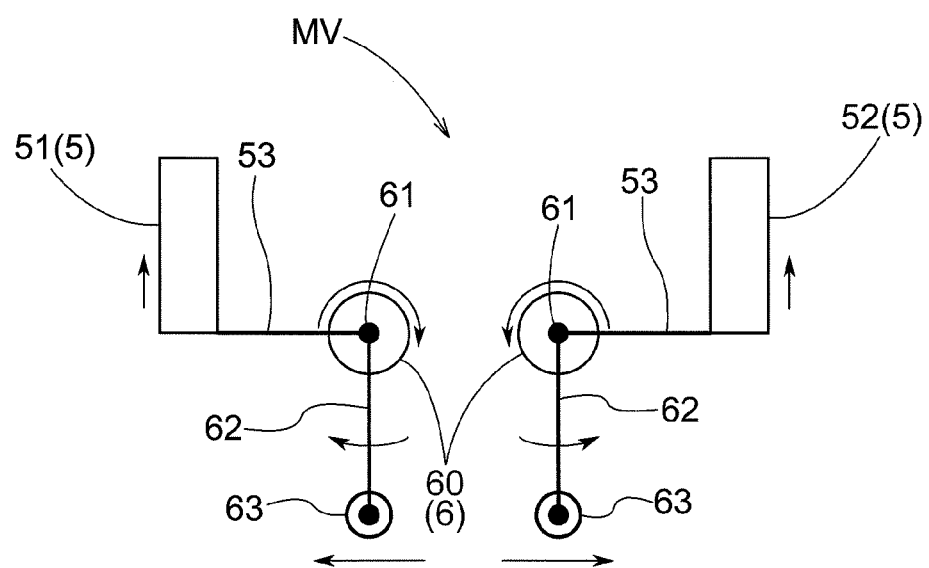
FIG. 8 is an explanatory view schematically showing movements of a first pedal, a second pedal and the displacement conversion mechanism.

As shown in FIG. 7 and also in FIG. 8 which is more schematic than the FIG. 7 illustration, the displacement operation mechanism MV includes an operational unit 5 supported to the vehicle body frame 10 and a displacement conversion mechanism 6 including a displacement conversion section 60 for converting an operational displacement of the operational unit 5 to a lateral displacement of the mower deck 30. Incidentally, in the instant embodiment, the operational unit 5 is constituted of a pedal unit operable by a driver's foot. And, this pedal unit consists of a first pedal 51 and a second pedal 52. Therefore, operational displacements for laterally displacing the mower deck 30 are stepping-on displacements of the first pedal 51 and the second pedal 52. The displacement conversion section 60 converts an operational displacement into an operational displacement needed for a lateral displacement of the mower deck 30.

The displacement conversion mechanism 6 is divided into a left displacement conversion mechanism 6 and a right displacement conversion mechanism 6. The left displacement conversion mechanism 6 utilizes an operational displacement of the first pedal 51 for a lateral displacement in first direction (left displacement) of the mower deck 30. The right displacement conversion mechanism 6 utilizes an operational displacement of the second pedal 52 for a lateral displacement in second direction (right displacement) of the mower deck 30. The arrangements of these two mechanisms are essentially identical. Thus, in the following discussion, the left displacement conversion mechanism 6 will be explained as being representative of both.

The left displacement conversion mechanism 6 further includes a first displacement transmission member 61 and a second displacement transmission member 62. The first displacement transmission member 61 is a shaft body operably coupled with a pedal shaft 53 of the first pedal 51 and configured to transmit a displacement of the pedal shaft 53 to the displacement conversion section 60. The displacement conversion section 60 is constituted of a gear, a cam or any combination thereof and configured to convert an inputted displacement to a pivotal displacement in the vehicle body transverse direction (first direction: left displacement) and to output the resultant pivotal displacement. The second displacement transmission member 62 is a pivot arm. the leading end of the second displacement transmission member 62 is operably coupled to or placed in abutment against a displacement action portion 63 fixed to the mower deck 30. The second displacement transmission member 62 is configured to transmit a pivotal displacement which is an action displacement outputted from the displacement conversion section 60 to the displacement action portion 63, thereby to laterally displace the displacement action portion 63, namely, the mower deck 30 to the left side.

With the above-described arrangement of the displacement operation mechanism MV in operation, when the driver steps on the first pedal 51 which is the left pedal, the mower deck 30 is laterally displaced to the left side and the grass mowing path is offset to the left side. Similarly, when the driver steps on the second pedal 52 which is the right pedal, the mower deck 30 is laterally displaced to the right side and the grass mowing path is offset to the right side.

Other Embodiments

The present invention is not limited to the arrangement illustrated in the above embodiment. Next, other embodiments of the present invention will be described one by one.

(1) In the foregoing embodiment the operational unit 5 is configured as a pedal unit consisting of the first pedal 51 and the second pedal 52. Instead of this, this unit 5 may be constituted of a single pedal. In this case, there will be provided a stopper for maintaining a stepped-on position of the single pedal. Then, in accordance with a stepping-on of the single pedal, the mower deck 30 will be laterally displaced to the left side and when the single pedal is returned to the home position (the position prior to the stepping-on operation), the mower deck 30 will be laterally displaced to the right side by an action of an urging means such as a spring.

(2) The operational unit 5 may be constituted of a handle lever unit operable by a driver's hand, rather than a pedal unit.

(3) The displacement operation mechanism MV may comprise a ball screw mechanism configured to convert a rotation of the operational unit 5 to a lateral displacement of the mower deck 30.

(4) In the foregoing embodiment, the mower deck 30 is disposed between the front wheel unit 1 as front wheels and the drive wheel unit 2 as rear wheels. Alternatively, the mower deck 30 may be disposed forwardly of the front wheels or rearwardly of the rear wheels.

Figure 9:
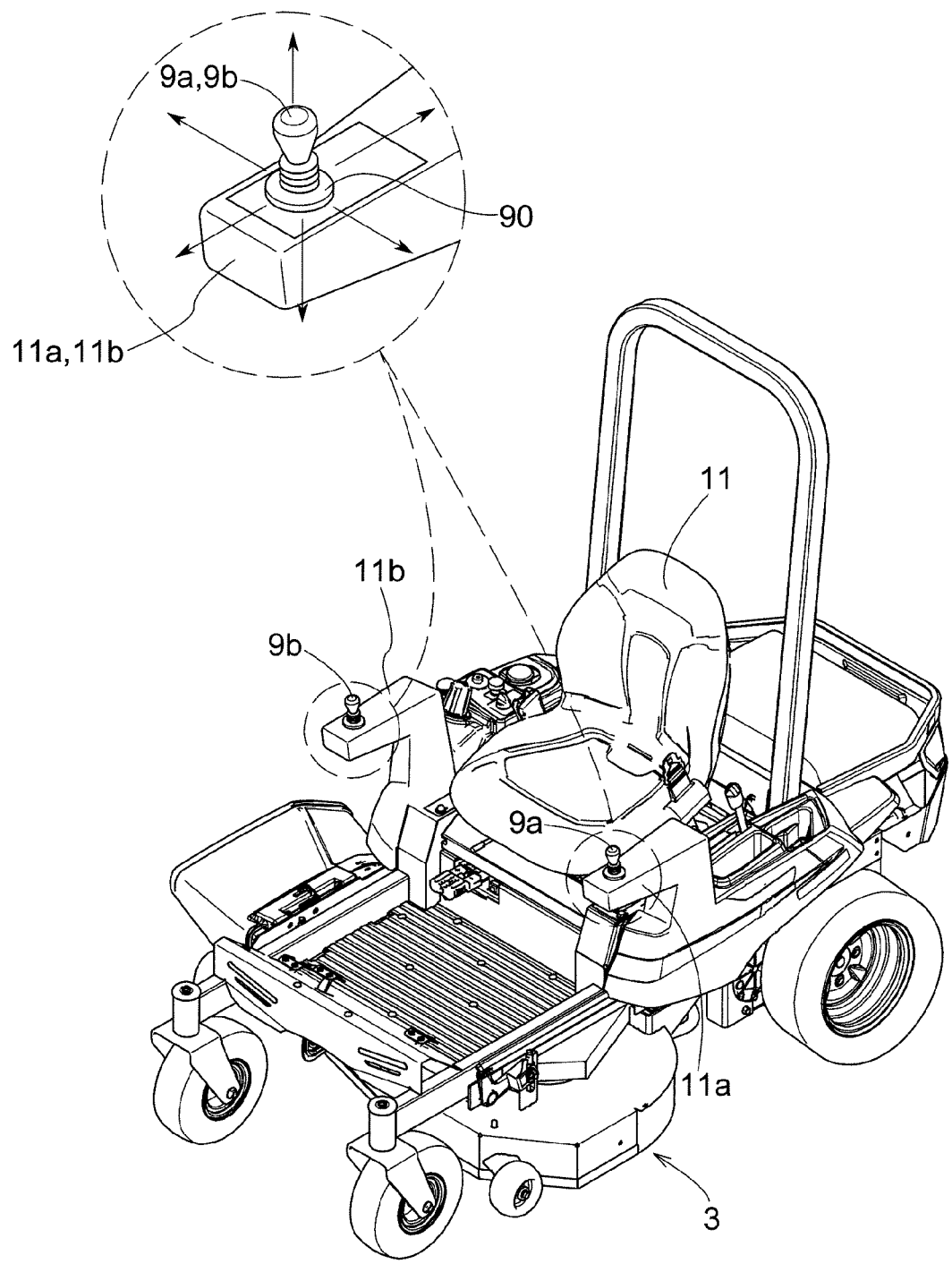
FIG. 9 is a perspective view of a riding grass mowing machine relating to a further embodiment.

(5) In the foregoing embodiment, as the steering unit 15, there was employed a lever operation mechanism consisting of an elongate left steering lever 15a and an elongate right steering lever 15b. Instead of this, as this unit, a joystick operation mechanism having a short lever may be employed, as shown in FIG. 9. In the example illustrated in FIG. 9, the joystick operation mechanism consists of a left joystick 9a and a right joystick 9b provided at the leading end regions of a left armrest 11a and a right armrest 11b of the driver's seat 11 via a base 90. The base 90 is adjustable to the front and rear sides, left and right sides and upper and lower sides, so joystick operations are possible at various positions suited for the driver's preference. In this example, pivotal movements of the left joystick 9a and the right joystick 9b in the front/rear direction alone are utilized for adjustment of rotational speeds (forward traveling and reverse traveling) of the drive wheel unit 2. In place of this, in case displacements of the joysticks in the front/rear direction and left/right direction are utilized, the joystick operation mechanism will be constituted of a single joystick and the grass mowing machine will be moved into a tilted direction of the joystick.

Incidentally, the arrangements disclosed in the foregoing embodiments (including the further embodiments) may be used in any combinations with the arrangements disclosed in any other embodiment unless contradiction results from such combinations. Further, it is noted that the embodiments disclosed in this detailed disclosure are only exemplary and embodiments of the present invention are not limited thereto, but may be modified in any appropriate matter within a range not deviating from the object of the present invention.

INDUSTRIAL APPLICABILITY

The present invention is applicable to a grass mowing machine having a mower unit including an electrically driven cutter blade.

The invention claimed is:

1. A grass mowing machine comprising:
a vehicle body frame supported on a ground surface via a wheel unit;
a mower deck incorporating a rotary cutter blade;
a coupling mechanism for coupling the mower deck to the vehicle body frame with allowing a lateral displacement of the mower deck in a vehicle body transverse direction;
a mower electric motor attached to the mower deck and configured to feed rotary power to the rotary cutter blade; and
a displacement operation mechanism for laterally displacing the mower deck in the vehicle body transverse direction in operative association with the coupling mechanism, wherein the coupling mechanism comprises a suspension mechanism for suspending the mower deck from the vehicle body frame;

the suspension mechanism includes a vehicle body bracket fixed to the vehicle body frame and a mower bracket fixed to the mower deck and a mower link coupled by a pin coupling to the vehicle body bracket and the mower bracket; and the pin coupling is configured to allow a lateral displacement of the mower bracket in the vehicle body transverse direction relative to the vehicle body frame.

2. The grass mowing machine of claim 1, wherein the displacement operation mechanism includes an operational unit supported to the vehicle body frame and a displacement conversion mechanism for converting an operational displacement of the operational unit to a lateral displacement of the mower deck.

3. The grass mowing machine of claim 2, wherein the operational unit comprises a pedal unit operated by a driver's foot and the operational displacement comprises a step-on displacement of a pedal.

4. The grass mowing machine of claim 3, wherein:
the pedal unit includes a first pedal and a second pedal; and
the displacement conversion mechanism is configured to convert a step-on displacement of the first pedal into a lateral displacement in one direction of the mower deck and to convert a step-on displacement of the second pedal into a lateral displacement in the other direction of the mower deck.

5. The grass mowing machine of claim 1, wherein the grass mowing machine is configured such that its traveling drive power is fed by a traveling electric motor.

6. A grass mowing machine comprising:
a vehicle body frame supported on a ground surface via a wheel unit;
a mower deck incorporating a rotary cutter blade;
a coupling mechanism for coupling the mower deck to the vehicle body frame with allowing a lateral displacement of the mower deck in a vehicle body transverse direction;
a mower electric motor attached to the mower deck and configured to feed rotary power to the rotary cutter blade; and
a displacement operation mechanism for laterally displacing the mower deck in the vehicle body transverse direction in operative association with the coupling mechanism,
wherein the displacement operation mechanism includes an operational unit supported to the vehicle body frame and a displacement conversion mechanism for converting an operational displacement of the operational unit to a lateral displacement of the mower deck.

7. The grass mowing machine of claim 6, wherein the coupling mechanism comprises a suspension mechanism for suspending the mower deck from the vehicle body frame.

8. The grass mowing machine of claim 6, wherein the operational unit comprises a pedal unit operated by a driver's foot and the operational displacement comprises a step-on displacement of a pedal.

9. The grass mowing machine of claim 8, wherein:
the pedal unit includes a first pedal and a second pedal; and
the displacement conversion mechanism is configured to convert a step-on displacement of the first pedal into a lateral displacement in one direction of the mower deck and to convert a step-on displacement of the second pedal into a lateral displacement in the other direction of the mower deck.

10. The grass mowing machine of claim 6, wherein the grass mowing machine is configured such that its traveling drive power is fed by a traveling electric motor.

* * * * *